United States Patent

Schonlau et al.

[11] Patent Number: 5,195,806
[45] Date of Patent: Mar. 23, 1993

[54] BRAKE PRESSURE CONTROL DEVICE FOR AUTOMOTIVE VEHICLES

[75] Inventors: Juergen Schonlau, Walluf; Holger von Hayn, Bad Vilbel; Alfred Birkenbach, Hattersheim; Ralf Harth; Wolfgang Ritter, both of Oberursel, all of Fed. Rep. of Germany

[73] Assignee: Alfred Teves GmbH, Frankfurt am Main, Fed. Rep. of Germany

[21] Appl. No.: 678,493

[22] Filed: Apr. 1, 1991

[30] Foreign Application Priority Data

Apr. 2, 1990 [DE] Fed. Rep. of Germany ....... 4010546

[51] Int. Cl.⁵ .................................................. B60T 8/32
[52] U.S. Cl. .................................. 303/9.67; 303/24.1
[58] Field of Search ................... 303/24.1, 9.67, 9.68, 303/9.75, 9.72, 84.1

[56] References Cited

U.S. PATENT DOCUMENTS

| | | | |
|---|---|---|---|
| 3,944,293 | 3/1976 | Ishigami et al. | 303/9.67 |
| 4,161,339 | 7/1979 | Kawaguchi et al. | 303/9.68 |
| 4,397,506 | 8/1983 | Inoue | 303/9.67 |
| 4,452,494 | 6/1984 | Kadota . | |
| 4,601,520 | 7/1986 | Schmitt | 303/24.1 |
| 4,652,058 | 3/1987 | Runkle et al. | 303/9.68 |
| 4,718,734 | 1/1988 | Gaiser | 303/24.1 |

FOREIGN PATENT DOCUMENTS

| | | |
|---|---|---|
| 0175089 | 3/1986 | European Pat. Off. . |
| 206937 | 8/1981 | United Kingdom . |
| 2129518 | 5/1984 | United Kingdom . |

Primary Examiner—Robert J. Oberleitner
Assistant Examiner—Lee W. Young
Attorney, Agent, or Firm—Robert P. Seitter; J. Gordon Lewis

[57] ABSTRACT

A rear brake pressure proportioning control device is disclosed, with a regulating piston (7) and with a valve closing member (9) being supported within a slidable control piston (8), the movement of the control piston interrupted at a predetermined rate of vehicle deceleration. A restriction (32) between the inlet and inlet chamber within which the control piston is disposed prevents a high rate of brake pressure increase from causing too high a rear brake pressure. A multiple-stage restrictor (26) is positioned in the inlet in order to prevent a very high rate of pressure increase of the brake pressure resulting in too low a rear brake pressure.

18 Claims, 5 Drawing Sheets

BRAKE PRESSURE CONTROL DEVICE FOR AUTOMOTIVE VEHICLES

INTRODUCTION

The invention is related to a brake pressure proportioning control device of a type responsive to the rate of vehicle deceleration.

BACKGROUND OF THE INVENTION

A brake pressure controller of this kind is known from the European patent description 175 089 B1. For the following reasons, a satisfactory control accuracy cannot be achieved with the prior-art brake pressure controller.

The inlet chamber of the state-of-the-art brake pressure controller is directly connected to the master brake cylinder by a duct so that the hydraulic fluid flows into the inlet chamber without any restriction. As a result, the point at which the proportionally reduced pressure is applied to the rear wheel brakes becomes strongly dependent on the rate of pressure build-up. In this way, in the event of a pressure surge due to a very rapid brake actuation, the proportioned pressure may exceed the desired value as a consequence of the inertia of the regulating piston.

A further disadvantage is that the state-of-the-art brake pressure controller is highly sophisticated and does not offer any reasonable possibility of component pre-assembly. Beyond this, the prior-art brake power controller is not adjustable so that any working tolerance influences the control accuracy.

This has a particular effect on driving safety when the brake power controller is employed as a twin controller in a brake with a diagonal subdivision of the brake circuits, since in that case the tolerances lead to application of different brake pressures in each of the rear wheel brakes.

SUMMARY OF THE INVENTION

It is, therefore, the object of the invention to avoid the disadvantages of the state of the art and to create a deceleration responsive brake pressure proportioning control device which is distinguished by an optimum control accuracy and simplified mounting.

In a brake pressure control device of this type, this object is achieved by providing a flow restriction at the inlet to an inlet chamber in the control device. In this way, a distinct improvement of the control quality is attained with the simplest means.

In order to avoid an effect caused by very elevated rates of pressure build-up in which the proportioned pressure to the rear wheel brakes is too low due to the exponential rise of the pressure differential at the flow restriction, it is envisaged in one embodiment of the invention that the cross section of the flow restriction increases as the pressure build-up rate rises. In a preferred embodiment of the invention, two different inlet flow restrictions are arranged parallel to each other, one low resistance flow restriction being closed below a pressure build-up rate threshold.

In order to ensure a rapid pressure decrease, it will be of advantage when the flow restriction is arranged parallel to a non-return valve which shuts off the flow direction from the hydraulic fluid source toward the inlet chamber. Manufacturing and mounting considerably simplified by the control piston being constructed plastic and of one piece construction preferably of duroplastic. As a result of this provision, stopping faces and mounting apertures for the valve closing member and/or securing means may be formed without any finishing operations. In order to eliminate friction due to the use of plastic material for the piston, the control piston is furnished with a PTFE bushing sealingly guided within the housing.

In the interest of a compact structure of the pressure control device, the regulating and/or control spring radially surrounds the guide section of the regulating and/or control piston so that the location of the application of the spring forces is a substantial radial distance from the corresponding longitudinal axis of the piston. In order to prevent any wedging of the pistons in the associated housing bore due to tilting moments, the pistons are furnished with an additional guide. In one preferred embodiment of the invention it is, therefore, envisaged that the control piston and the regulating piston slidably engage each other in the axial direction.

In order to be able to balance tolerances which are due to manufacture and to mounting, it will be of advantage when the spring force acting on the regulating piston is adjustable. For this purpose, it is envisaged in one embodiment of the invention that the regulating piston is axially adjustably connected to an intermediate element which is subject to the force of the regulating spring. Appropriately, a capability is provided for engaging the regulating piston with an adjusting tool. Since the adjustment is made in the ready mounted condition, it will be of advantage when the regulating piston extends coaxially with the outlet, as in that case the adjusting tool may be introduced through the outlet and no additional housing bore is necessary which would be required to be blocked after the adjustment operation.

BRIEF DESCRIPTION OF THE DRAWINGS

Further advantageous features and the mode of functioning of the invention will be revealed by the following description of embodiments which is made with reference to the accompanying drawings, in which.

DETAILED DESCRIPTION OF THE ALTERNATIVE EMBODIMENTS OF THE INVENTION

In the following, identical reference symbols will be chosen for components which are identical to one another.

Figure 1:
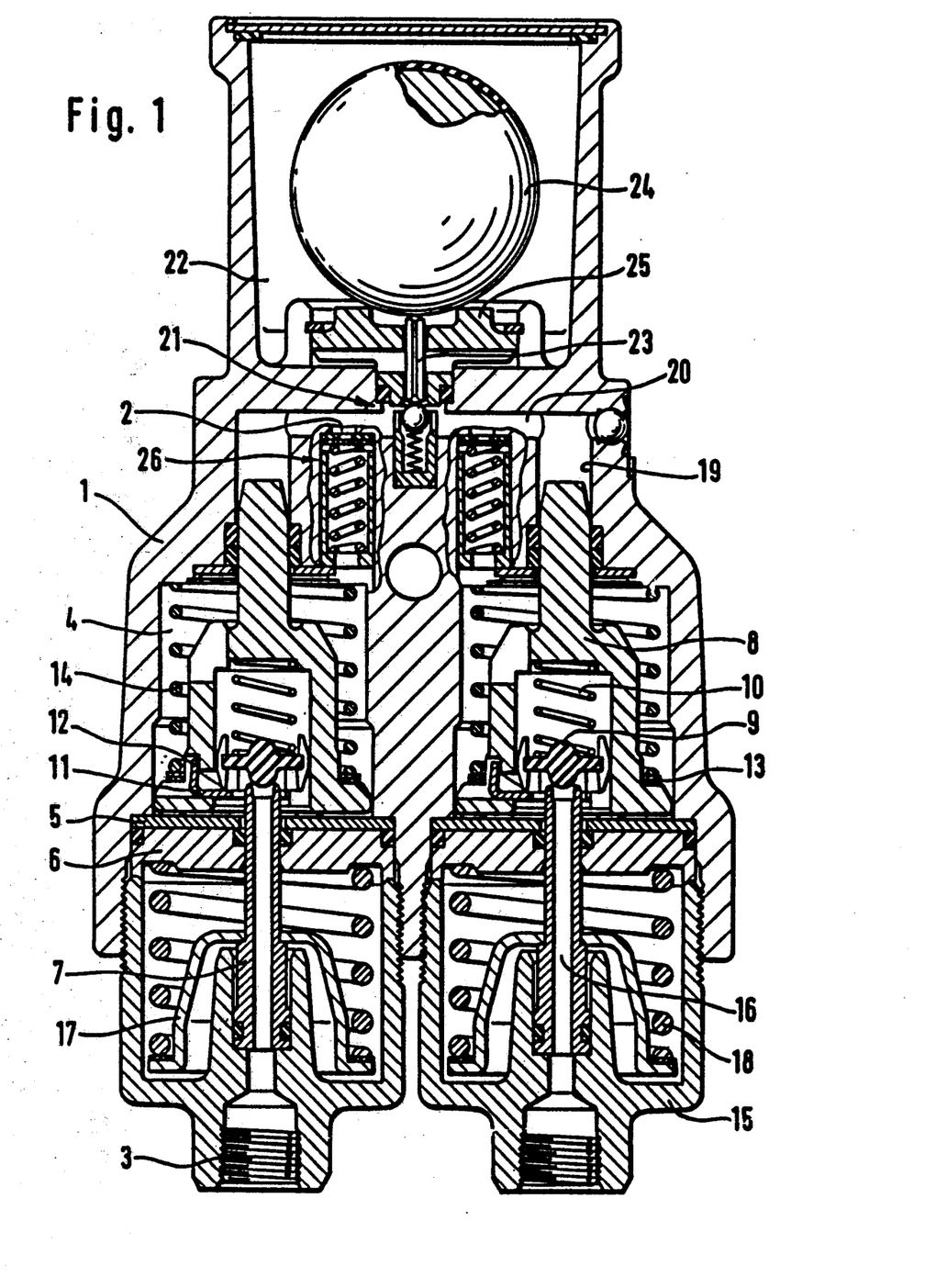
FIG. 1 is a longitudinal sectional view of an inventive brake pressure proportioning control device.

FIG. 1 shows a brake pressure proportioning control device comprising a twin controller with a housing 1 within which two complete controller units are integrated, each of which connected through a separate inlet 2 to a pressure chamber of a tandem master cylinder through an outlet 3 to the wheel cylinder of a rear wheel brake. The two controller units are identical and the whole brake pressure control device is designed symmetrically, so that the following description applies to both controller units of the twin controller.

The inlet 2 is shown rotated into the plane of the drawing, and leads into an inlet chamber 4 which is defined by an intermediate disc 5 and a guide disc 6 and into which both a regulating piston 7 and a control piston 8 project. At its end projecting into the inlet chamber 4, regulating piston 7 is furnished with a sealing seat ineracting with a valve closing member 9 which is supported within the control piston 8, in abutment against a stop rigid with the control piston 8, and prestressed in the direction of the regulating piston 7 by a valve spring 10. The stop is formed by a disc 11 which is slidable into the control piston 8 from a radial direction and which has a securing section 12 bent about 90 degrees out of the plane of the disc and engaging a corresponding recess on the control piston 8.

The disc 11 is pushed laterally into the control piston 8 after insertion of the valve closing member 9 and the valve spring 10 into the control piston 8. Subsequently, one or a plurality of adjusting discs 13 and a control spring 14 are slid onto the control piston 8 so that the disc 11 is secured in the radial direction of the regulating piston 7 and at one end engages the housing 1, the other end engaging the adjusting discs 13 which in turn are in abutment against a step of the control piston 8.

In the non-actuated condition, the control piston 8 is abutted against the intermediate disc 5 which is fixed within the housing 1 by a screw cap 15, together with the guide disc 6. In this configuration, radial through ducts are provided in the front face of the control piston 8 facing the intermediate disc 5.

The two screw caps 15 are each formed with the outlet 3 passing over into a stepped bore within which a larger diameter portion of a stepped diameter section of the regulating piston 7 is sealedly and axially slidingly supported. The smaller diameter section of the regulating piston 7 is sealedly guided in the guide disc 6 and the intermediate disc 5. The regulating piston 7 is formed with a central through bore 16 which connects the inlet chamber 4 to the outlet chamber 3.

The regulating piston 7 is formed about the outer circumference thereof with a step against which a spring cup 17 is abutted which is subjected to the thrust of a regulating spring 18, so urging the regulating piston 7 in the direction of the outlet 3. In this configuration, the end of the regulating spring 18 disposed away from the spring cup 17 engages the guide disc 6.

The end of the control piston 8 which projects from the inlet chamber 4 sealedly extends into a bore 19 which is connected through a transverse bore 20 and through a valve 21 to a tank 22. The valve 21 is a spring-loaded ball-type non-return valve which shuts off flow in the direction from the transverse bore 20 into the tank 22, being, however, able to be opened by a valve tappet 23.

The brake pressure proportioning control device is incorporated in the vehicle such that its longitudinal axis extends in a vertical direction. The valve tappet 23 extends through a bearing insert 25 on which an inertial element 24 rests in a stable equilibrium. As long as no inertial forces which are due to longitudinal and/or transverse accelerations act on it, the inertial element 24, comprising a ball, will remain in the illustrated centered position, and will keep the valve 21 opened by the valve tappet 23.

FIG. 1 shows the brake pressure control device in its position of rest, that is to say, when the brake is not actuated. During a braking action, hydraulic fluid will controlledly be conveyed through the inlet 2 and supplied to the rear wheel brakes when the control valve 7, 9 is open. As the brake pressure increases, the control piston 8 will gradually be slid into the bore 19 against the force of the control spring 14. During this procedure fluid will be displaced out of the bore 19, 20 into the tank 22. The regulating piston 7 will simultaneously slide into the inlet chamber 4 against the force of the regulating spring 18. In this context, the pressurized surfaces on the regulating piston 7 and the control piston 8 as well as the forces exerted by the control spring 14 and the regulating spring 18 are set such that the flow passage between the valve seat on the regulating piston 7 and the valve closing member 9 remains open. As a result, the pressure in the outlet 3 equals the pressure which is supplied to the inlet 2.

As soon as the vehicle deceleration exceeds a predetermined value, the inertial element 24 will move out of its position of rest and will tilt over its support at the bearing insert 25 so that the valve tappet 23 is released and the valve 21 can close. As a result, the bore 19 and the transverse bore 20 will be shut off from the tank 22 so that the control piston 8 will not be able to slide farther into the bore 19. When the pressure increases further, the control piston 7 will slide so far into the inlet chamber 4 that it can come into abutment against the valve closing member 9, and as a result the connection between the inlet chamber 4 and the outlet 3 will be interrupted for the first time. In the event of a further pressure rise, the pressure in the outlet 3 will be reduced as compared to the pressure in the inlet 2 in proportion to the pressurized surfaces which are effective on the regulating piston 7. The rear brake pressure is, thus, proportionally reduced when a predetermined rate of deceleration is exceeded.

A restrictor 26 is arranged in the inlet 2 in order to avoid the effects of a rapid pressure build-up in the event of a sudden brake actuation on the degree of pressure proportioning. The restrictor 26 is illustrated enlarged in FIG. 2. The restrictior 26 is retained in the housing by a retainer plate and is comprised of a valve cup 27 in which a compression spring 28 is positioned, one end engaged on the bottom of the valve cup and the other end bringing pressure to bear on an orifice disc 29. On the front side of the orifice disc 29 which faces away from the compression spring 28, an annular elastic disc 30 is provided which is urged by the force of the compression spring 28 against a sealing seat 31 which is formed on the housing around the inlet bore 2. The valve cup 27, the orifice disc 29 and the elastic disc 30 have a radial play relative to their mounting bore. The orifice disc 29 is formed with a central restrictor bore 32 of small diameter around which a plurality of return bores 33 are arranged at a distance of approximately half the radius of the orifice disc. While the restrictor bore 32 extends coaxially with the central passage of the annular disc 30, the return bores 33 are covered by the disc 30.

Figure 2:
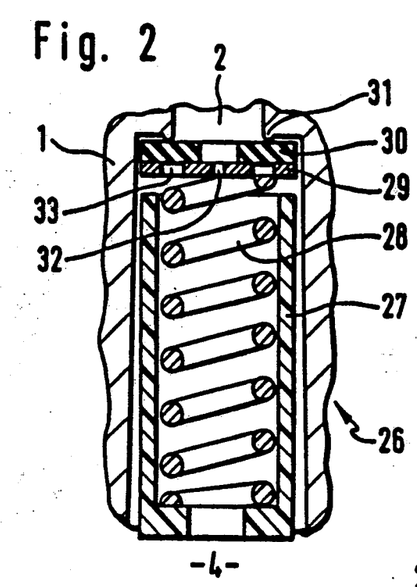
FIG. 2 is an enlarged fragmentary view of a portion of the device shown in FIG. 1 showing the details of the restricting point in the inlet.

When pressure is being built up in the inlet 2, then the hydraulic fluid will be conveyed through the bore 32 to the inlet chamber 4, and as a result, a pressure surge will be reduced, so that the latter will not have any negative effect on the movement of the control piston 8 and, consequently, on the proportioned pressure. The diameter of the restrictor bore 32 is dimensioned on the basis of a mean actuating rate of the brake system.

An arrangement is provided to prevent the effect of extremely elevated actuating rates on the proportion of pressure reduction of the inertia of the control piston 8, resulting in insufficient rear wheel braking. The restrictor 26 has the capability that in the event of extremely elevated actuating rates, the orifice disc 29 and the disc 30 slide against the force of the compression spring 28, and as a result the disc 30 will be lifted off from the sealing seat 31, and hydraulic fluid flows radially around the disc 30 and the orifice disc 29 and, thus, reaches the inlet chamber 4 almost without any restrictive effect.

The return bores 33 are provided in order to achieve as rapid as possible a pressure reduction. The diameter of the sealing seat 31 is, therefore, dimensioned such that a bending-through of the internal radius of the disc 30 is allowed in the course of the pressure reduction, as a result whereof the return bores 33 will be opened at least in part. Owing to the described design of the restrictor 26 the sound functioning of the brake system is safeguarded even if the restrictor bore 32 should become clogged, since in that case the pressure build-up in the inlet chamber 4 can take place through the return bores 33 by a radial flow around the restrictor.

Figure 3:
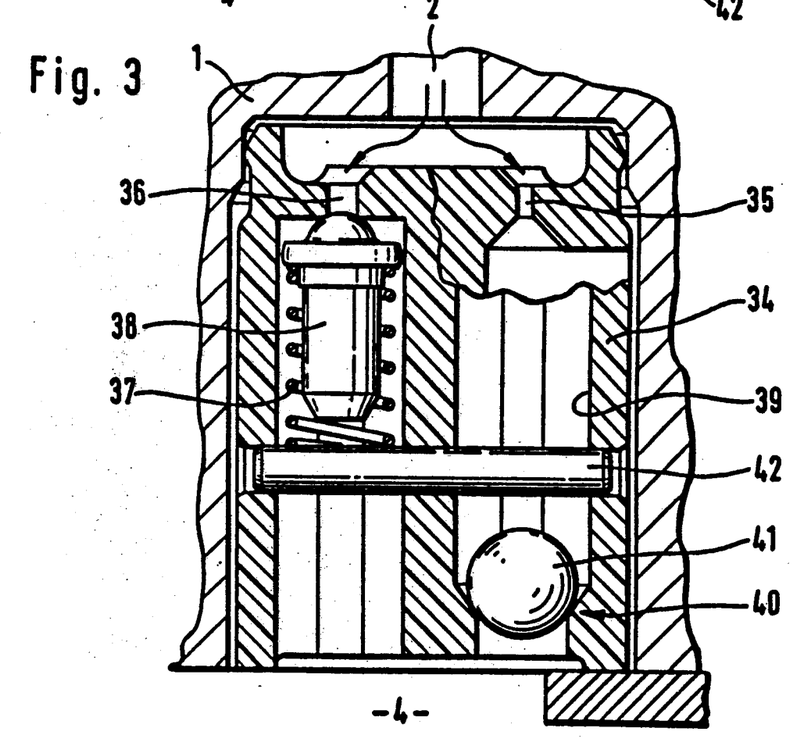
FIG. 3 is a fragmentary partially sectional view of a two-stage embodiment of an inlet restrictor with non-return valve.

FIG. 3 shows a two-stage restrictor which, also is responsive to the actuating velocity. Two exactly defined restriction stages are created by this design. Owing to that two-stage restriction, the influence of the pressure build-up velocity, of the inertia of the brake system and of the lag times between the brake pressure build-up and the deceleration build-up velocity, of the inertial of the brake system and of the idle times between the brake pressure build-up and the deceleration build-up may be compensated which may lead to an unfavorable level of the changeover point.

In the event of low actuating rates a flow restriction positioned in the connection going from the master cylinder to the rear axle will effect a satisfactory adaptation of the lag in the pressure build-up in the rear axle and of the lag in the deceleration of the vehicle, but in the event of very elevated actuating rates, the lag of the brake system is considerably longer than the lag of the vehicle deceleration because of the exponentially increasing restriction effect and of the inertia of the regulating and control pistons. During high speeds this will lead to a distinct reduction of the proportioned pressure. The restriction device according to FIG. 3 offers an excellent solution o the problems described just now.

The restrictor insert according to FIG. 3 is comprised of a restrictor housing 34 which is sealedly positioned within the housing 1 of the pressure control device between the inlet 2 and the inlet chamber 4. A first flow restriction opening 35 and a second flow restriction opening 36 are located within restrictor housing 34, the second flow restriction opening 36 being closed, on the side facing the inlet chamber 4, by a valve body 38 which is biased by a compression spring 37. The second flow restriction opening 36 has a larger restrictor cross section than the first flow restriction opening 35. Both flow restricting openings 35, 36 are connected to each other within the restrictor housing 34. The flow restricting opening 35 is drawn rotated into the drawing plane.

The restrictor housing 34 is furnished with a third longitudinal bore 39 in which a non-return valve 40 is positioned, which shuts off the flow direction from the inlet 2 toward the inlet chamber 4. The non-return valve 40 is provided with a sealing seat formed on the restrictor housing 34 onto which a ball 41 rests. Since the restrictor device is positioned exactly vertically in the vehicle, a spring acting on the ball 41 may be foregone. A pin 42 arranged in a transverse bore within the restrictor housing 34 serves as a securing means for the ball 41 against being lost and with its section projecting into the bore of the valve body 38 as a support for the compression spring 37.

In the event of a pressure built-up in the inlet 2, hydraulic fluid will flow through the first flow restriction opening 35 into the inlet chamber 4. Since the pressure differential on the first flow restriction opening 35 increases exponentially as the actuating velocity increases, the difference between the pressure in the inlet 2 and the one in the inlet chamber 4 will become that high as soon as a defined actuating rate is reached, such that the valve body 38 is slid against the force of the compression spring 37 and opens the second flow restriction opening 36. From that moment on, the reduction of the pressure build-up within the inlet chamber 4 will be clearly lower as compared to the pressure build-up in the inlet 2. A rapid pressure decrease is achieved by an unrestricted discharge of hydraulic fluid out of the inlet chamber 4 through the non-return valve 40.

Figure 4:
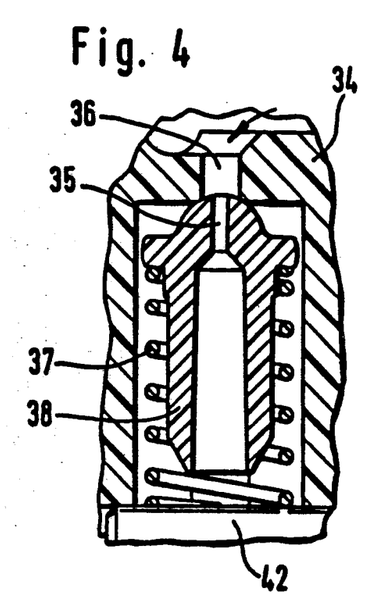
FIG. 4 is an enlarged sectional view of an alternative design of the restricting openings of the two stage inlet restrictor according to FIG. 3.

FIG. 4 shows a still more compact set-up of a two-stage restrictor, the second flow restriction opening 36 being integrated within the restrictor housing 34, while the first flow restriction opening 35 is located within the valve body 38, taking the form of a central through bore.

Figures 5, 6:
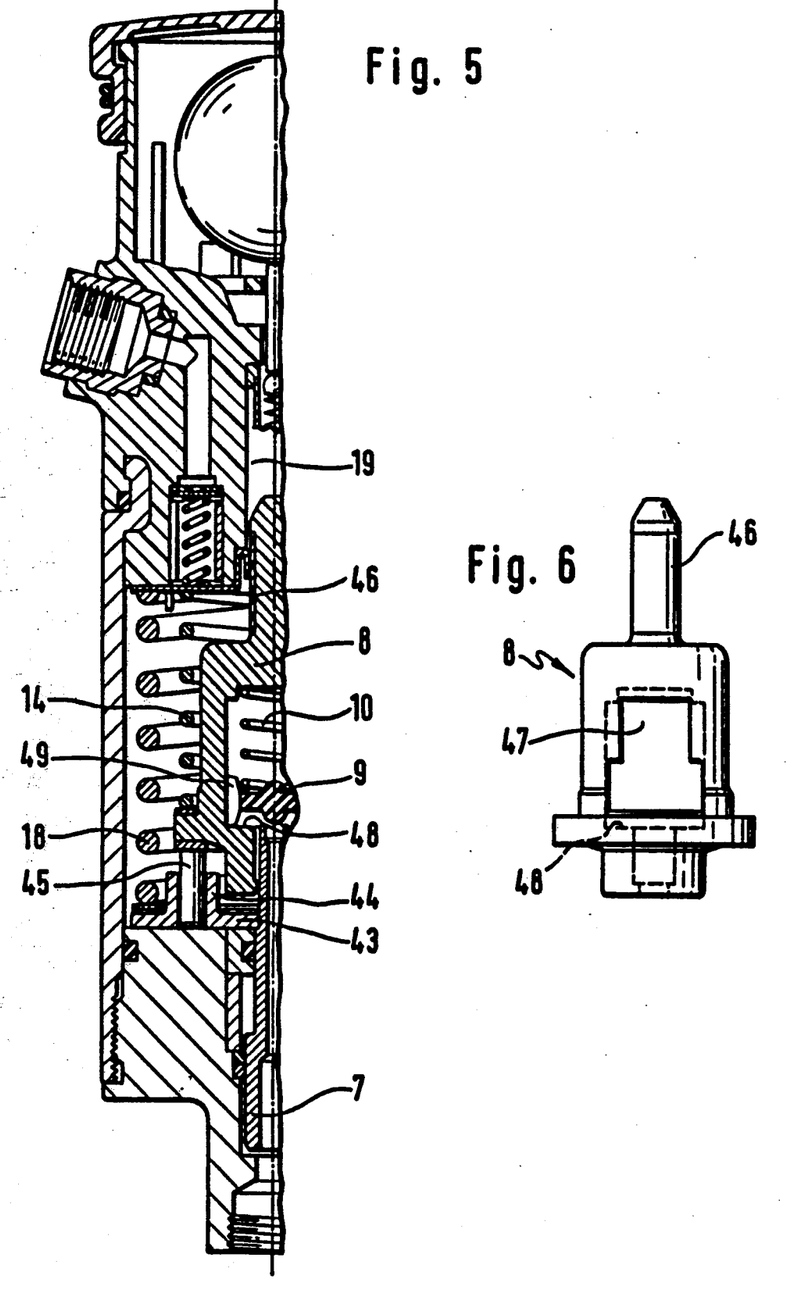
FIG. 5, is a longitudinal sectional fragmentary view of another embodiment of a device according to the invention.
FIG. 6 is an elevational view of a control piston incorporated in the embodiment of FIG. 5.

FIG. 5 shows a compact and especially short embodiment of the inventive brake pressure control device. This embodiment is characterized above all by the control spring 14 being nested within the regulating spring 18, as a result whereof the overall length may be reduced to a considerable extent.

While the control spring 14 engages directly on the control piston 8, the force of the regulating spring 18 is transmitted through a plate 43 to the regulating piston 7, which plate 43 has a distinctly larger diameter than the control piston 8. Since the force is transmitted by the regulating spring 18 to the control piston 7 relatively far outside in radial direction, it is imaginable that—due to working tolerances—tilting moments originate about a transverse axis of the regulating piston 7 which may lead to a wedging of the regulating piston 7. For this reason, a plurality of axially extending collar-shaped guide sections 44 are formed on the plate 43, which guide sections are each engaged by one of a plurality of guide pins 45. The guide pins 45 are received in a ring which is fixed to the control piston 8.

The control piston 8 is made of duroplastic material and is furnished at its section projecting into the bore 19 with a PTFE bushing 46, and as a result, the friction in the sealing section is minimized.

It is another feature of this embodiment the mounting of the valve closing member 9 and of the valve spring 10 takes place through a mounting window 47 which is formed in the control piston 8 and which can clearly be seen in FIG. 6. While the valve spring 10 is being kept compressed, the valve closing member 9 and the valve spring 10 are pushed into the control piston 8 through the mounting window 47. Now, due to the action of the valve spring 10, the supporting arms 49 of the valve closing member 9 which extend in radially outward direction and are distributed about the circumference, come to be abutted against a step 48 in the bore within the control piston 8. The valve closing member 9 is designed symmetrically in respect of its transverse plane, so that any improper mounting is prevented. In order to avoid an improper mounting of the valve spring 10, the mounting window 47 is designed in its upper range with a smaller width than in its lower range through which the valve closing member 9 is guided during mounting.

Figures 7, 8:
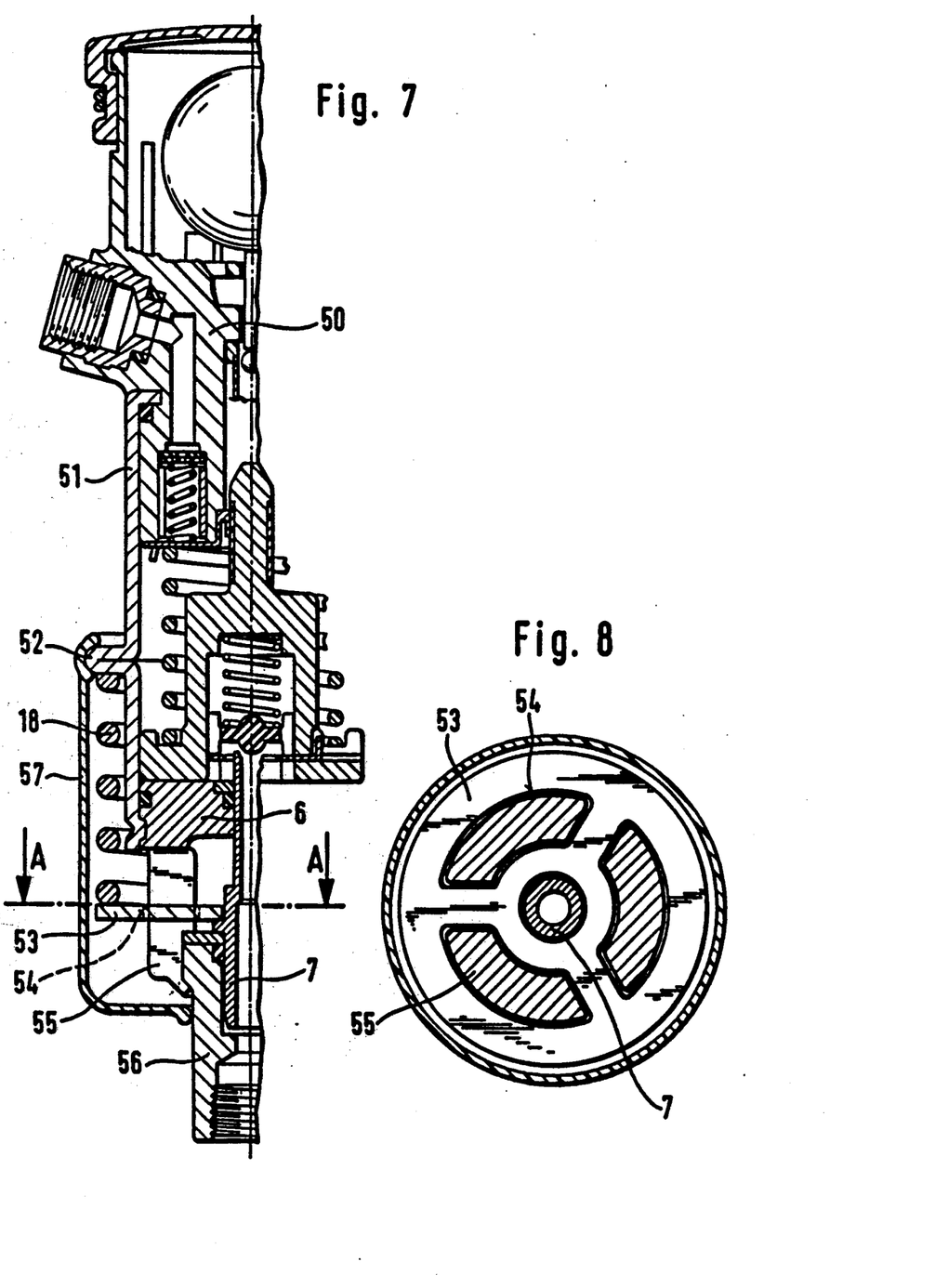
FIG. 7 is a cross sectional fragmentary view of a third embodiment of a device according to the invention.
FIG. 8 is a transverse cross sectional view taken through the brake pressure control device shown in FIG. 7.

FIG. 7 shows another embodiment of the invention having certain constructional differences with the embodiment of FIG. 1 described below. In essence, the housing is comprised of the solid basic body 50 and of a housing part 51 which has a substantially tubular shape and is preferably a deep-drawn part. The housing part 51 is caulked or swedged both to the basic body 50 and to the guide disc 6 and is formed with a ring-shaped circumferential, outwardly directed bead 52 engaged by one end of the regulating spring 18. For up to approximately one half of its length, the regulating spring 18 is disposed radially around the control piston 8 and the nesting control spring 14. The regulating spring 18 brings pressure to bear on the regulating piston 7 through the spring retainer plate 53, which has a substantially disc-shaped configuration and which in the range of its central diameter is furnished with a plurality of recesses 54 through which axially directed projections 55 of the guide disc 6 extend with a slight play. With their end directed away from the guide disc 6, the projections 55 are caulked to a connecting part 56 made as a stamping which serves, on one hand, as a connection for the outlet and, on the other hand, as a guide for that section of the regulating piston 7 which has a larger diameter. The projections 55 serve simultaneously as an anti-tilt means for the spring retainer plate 53. The regulating spring 18 and the spring retainer plate 53 are surrounded by a protective cap 57 which is snapped over the bead 52.

A cross section along the line A—A in FIG. 7 is shown in FIG. 8.

Figure 9:
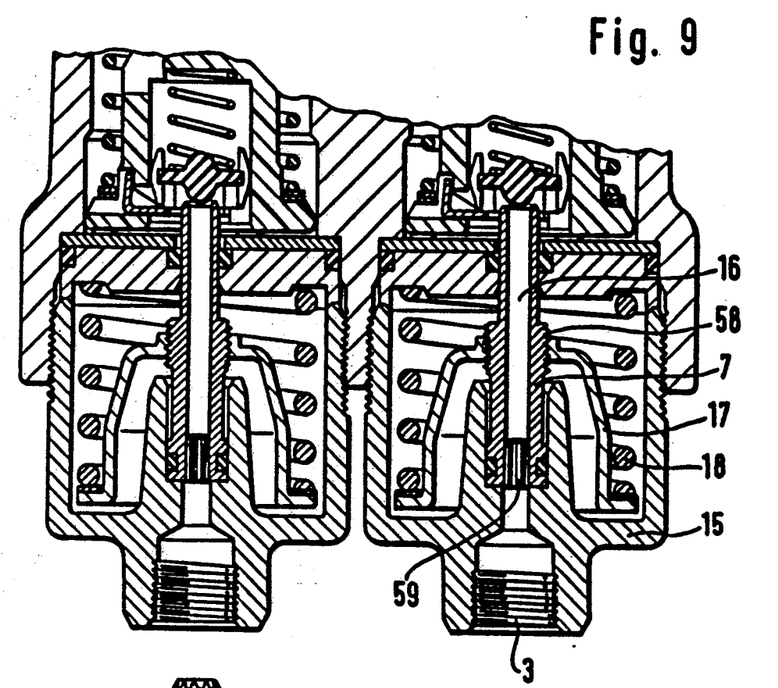
FIG. 9 is a fragmentary longitudinal cross section of an embodiment of the invention in which the regulating spring is adjustable.

FIG. 9 shows an embodiment of the invention which differs from the design according to FIG. 1 in that one each threaded section 58 is formed on the regulating piston 7, by which the regulating pistons are adjustably screwed, by means of an adjustment thread, to the associated spring cups 17. At the end of the through bore 16 in the regulating piston 7 facing the outlet 3 an internal spline 59 is formed which can be engaged by a corresponding tool being introducible through the outlet 3. The spring force of the regulating spring 18 which acts on the regulating piston may be adjusted by rotating the regulating piston 7 within the spring cup 17. The spring cup 17 need not be retained during the adjusting procedure sinceit is secured friction-tightly against rotation by the regulating spring 18.

By the adjustment of the spring force of the regulating spring, the switch point of the regulating piston 7 which switches depending on the pressure may be exactly adjusted, on one hand, and, on the other hand, it allows adjusting of both regulating pistons to exactly the same switch point.

Figure 11:
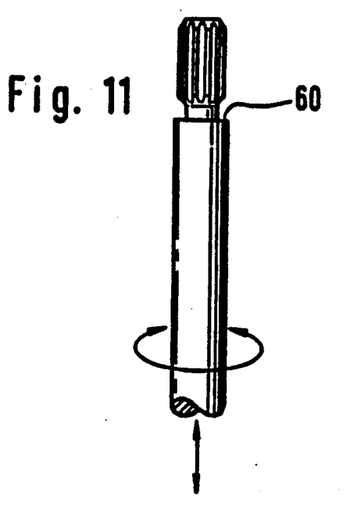
FIG. 11 is a fragmentary elevational view of an adjusting tool.

In a design version as per FIG. 9, a tool, for example, like that illustrated in FIG. 11 will enable, when the brake pressure control device is unpressurized, to adjust the force of the regulating spring 18 acting on the regulating piston 7. The tool is provided with a male spline matching the internal spline 59 and with a stop 60 which is brought into abutment against the front face of the regulating piston 7. The tool is then pressed against the regulating piston 7, and while the force produced is being measured, the spring force of the regulating spring 18 is adjusted.

A second adjusting possibility consists in the direct adjustment of the change-over pressure while the brake pressure control device is pressurized, the spring characteristic of the control spring being indirectly taken into account all along, just the same as the closing travel of the regulating valve 9, 7.

Figure 10:
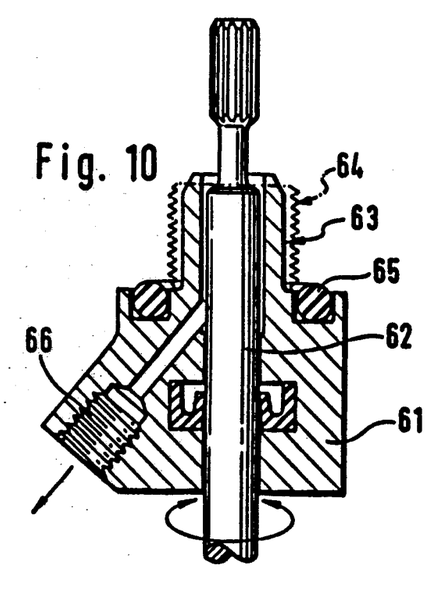
FIG. 10 is a partially sectional illustration of an adjusting apparatus.

A direct adjustment of the change-over pressure may be carried out by an adjusting apparatus according to FIG. 10. That adjusting apparatus is comprised of a basic body 61 within which the shaft 62 of the tool is axially slidably guided. The basic body 61 is furnished with a centering attachment 63 or with a thread 64 with which it is adapted to be inserted into the outlet 3. A sealing ring 65 is provided for sealing between the adjusting apparatus and the screw cap 15.

A radial play exists between the shaft 62 and the basic body 61 in the range of centering attachment 63, and respectively of the screwed union 64. In this range, a pressure connection 66 branches off from the longitudinal bore. Beneath the range which is provided with a play, the shaft 62 is sealed off in respect of the basic body 61.

For the adjustment of the pressure control device the inertia element 24 is lifted off from the bearing insert 25, so that the valve 21 will close. A pressure gauge is connected to the pressure connection 66 of the adjusting apparatus which is connected to the outlet 3. Subsequently, pressure fluid, in particular compressed air, is supplied to the inlet 2 at a defined pressure. Now, by rotating the tool, the regulating piston 7 is screwed in in the direction of the valve closing member 9 until the regulating piston 7 and the valve closing member 9 come to just be sealingly engaged with each other. This condition may be detected with a pressure gauge connected to the pressure connection 66.

What is claimed is:

1. A brake pressure proportioning control device for a hydraulic brake system for an automotive vehicle, said brake system operated by hydraulic pressure adapted to proportionally reduce fluid pressure applied to a rear wheel brake included in said system, said device comprising: a housing defining an inlet chamber, at least one hydraulic fluid inlet and one hydraulic fluid outlet in said housing each communicating with said inlet chamber, said inlet adapted to be connected to a source of operating fluid pressure, said outlet adapted to be connected to said rear wheel brake; pressure reducing valve means in said housing disposed between said inlet chamber and said outlet causing a proportionally reduced fluid pressure to be established between said inlet chamber and said outlet, said pressure reducing valve means including a regulating piston having one end protruding into said inlet chamber and having a sealing seat formed on said one end and a through bore extending through said sealing seat from said one end to another end of said regulating piston, said regulating piston subjected to fluid pressure in said inlet chamber at said one end and to fluid pressure of said outlet at said another end and configured to be urged in a direction towards said one end by the net effect of said fluid pressure; said pressure reducing valve means including a valve closing member located opposite said sealing seat to be movable thereon to close said bore; regulating spring means urging said regulating piston in a direction away from said valve closing member; a control piston mounted in said inlet chamber; said valve closing member being supported by said control piston; said control piston mounted to be displaceable towards and away from said sealing seat, spring means urging said control piston towards said sealing seat, said control piston configured to be moved away from said sealing seat due to the effects of fluid pressure in said inlet chamber acting thereon, causing said valve closing member to be moved away from said sealing seat at said one end of said regulating piston with increasing fluid pressure in said inlet chamber to prevent operation of said pressure reducing valve means; vehicle deceleration responsive means operative to prevent said displacement of said control piston upon the vehicle deceleration reaching a predetermined rate to thereafter allow operation of said pressure reducing valve means; and flow restriction means defining a restrictive flow path disposed between said inlet and said inlet chamber substantially reducing the rate of build up of fluid pressure in said inlet chamber upon development of a predetermined rate of increase of fluid pressure said inlet, whereby a substantial reduction in the rate of build up of fluid pressure in said inlet chamber occurs upon a sudden development of elevated fluid pressure at said inlet.

2. A brake pressure proportioning control device as claimed in claim 1, wherein said flow restriction means includes means defining a flow path that increases in cross sectional area as the rate of fluid pressure build-up at said inlet increases beyond a predetermined rate to a cross sectional area that allows unrestricted fluid flow from said inlet to said inlet chamber.

3. A brake pressure proportioning control device as claimed in claim 1, further including a non restrictive flow path between said inlet and said inlet chamber arranged parallel to said restrictive flow path between said inlet and said inlet chamber, and means normally closing said non restrictive flow path below a predetermined pressure build-up rate.

4. A brake pressure proportioning control device as claimed in claim 3, wherein said flow restriction means includes a disc interposed between inlet and said inlet chamber and having an orifice defining said restrictive flow path, an inlet sealing seat controlling fluid communication between said inlet and said inlet chamber, and means urging said disc onto said inlet sealing seat, said disc, upon said rate of fluid pressure buildup at said inlet reaching said predetermined pressure build-up rate, moves away from said sealing seat to establish unrestricted fluid flow there around.

5. A brake pressure proportioning control device as claimed in claim 1, further including a non-return valve arranged parallel to said restrictive flow path of said flow restriction means which shuts off the flow in the direction from said inlet toward said inlet chamber.

6. A brake pressure proportioning control device as claimed in claim 5, wherein said flow restriction means and said non-return valve are integrated in one component.

7. A brake pressure control device as claimed in claim 1, wherein said control piston is constructed of one piece of a plastic material.

8. A brake pressure proportioning control device as claimed in claim 1, wherein said control piston is formed at one end with an axially extending open cavity and wherein said valve closing member is secured within said cavity by a locking plate disposed in an opening extending radially into said control piston, said locking plate held by said spring means acting on said control piston.

9. A brake pressure proportioning control device as claimed in claim 1, wherein said control piston includes a section sealingly mounted within said housing and further including a PTFE bushing mounted over said control piston at said section.

10. A brake pressure proportioning control device as claimed in claim 1, wherein said control piston is formed with a radial mounting aperture and at said end facing said regulating piston, said control piston is formed with a radially inwardly directed step.

11. A brake pressure proportioning control device as claimed in claim 1, wherein said valve closing member is substantially symmetrical.

12. A brake pressure proportioning control device as claimed in claim 1, wherein said control piston and said regulating piston are axially slidably engaged with each other.

13. A brake pressure proportioning control device as claimed in claim 1, further including a spring retainer disc which transmits the force of said regulating spring means to said regulating piston is in engagement with axially extending guide surfaces fixed to said housing.

14. A brake pressure proportioning control device as claimed in claim 1, wherein said spring means urging said control piston towards said sealing seat comprises a control spring and wherein said regulating spring means comprises a regulating spring, said control spring and said regulating spring arranged at least in part nested together.

15. A brake pressure proportioning control device as claimed in claim 1, wherein said regulating piston is axially adjustably connected to an intermediate element which is subject to the action of said regulating spring means.

16. A brake pressure proportioning control device as claimed in claim 1, wherein said regulating spring means includes a threaded adjustable engagement with said regulating piston, and said regulating piston is formed with features engagable with an adjusting tool to enable rotation to adjust the effect of said regulating spring means.

17. A brake pressure proportioning control device as claimed in claim 1, wherein said regulating piston extends coaxially with said outlet.

18. An automotive vehicle brake system brake pressure proportioning control device adapted to proportionally reduce the fluid pressure applied to a rear brake included in said brake system, comprising:
 housing means defining a hydraulic fluid inlet adapted to be connected to a source of fluid pressure and a hydraulic fluid outlet adapted to be connected to said rear brake;

an inlet chamber in said housing communicating with said inlet and said outlet;

flow restriction means interposed between said inlet and said inlet chamber effective to substantially reduce the rate of fluid pressure build-up in said inlet chamber upon development of a predetermined rate of increase in fluid pressure at said inlet;

a control piston disposed for displacement in said inlet chamber;

pressure regulating valve means disposed between said inlet chamber and said outlet, said pressure regulating valve means including a regulating piston formed with a seat, and also including a valve closing member adapted to be able to be moved onto said seat to restrict communication between said inlet chamber and said outlet; said regulating piston subjected to fluid pressure in said inlet chamber and said outlet, causing said regulating piston to tend to be moved towards said seat towards said valve closing member with increasing outlet pressure to reduce said outlet pressure; regulating spring means urging said regulating piston away from said valve closing member;

said valve closing member carried by said control piston for displacement therewith; spring means causing said control piston to be urged towards said seat, said control piston configured to be urged away from said seat by fluid pressure in said inlet chamber to carry said valve closure member away from said seat and thereby prevent operation of said pressure regulating valve means; and means operative to disable displacement of said control piston away from said seat in response to a predetermined rate of deceleration of said device to enable operation of said pressure regulating valve means to proportionally reduce said outlet pressure from that in said inlet chamber.

* * * * *